(12) United States Patent
McLaughlin et al.

(10) Patent No.: US 9,537,848 B2
(45) Date of Patent: Jan. 3, 2017

(54) APPLICATION SECURITY SYSTEM AND METHOD

(71) Applicant: Bottomline Technologies (DE) Inc., Portsmouth, NH (US)

(72) Inventors: Brian Smith McLaughlin, Hampton, NH (US); Leonardo B. Gil, Derry, NH (US); Marshall Joseph Tracy, Westbrook, ME (US); Erik Vaughn Mitchell, Alna, ME (US); Jeffrey Todd Dixon, Falmouth, ME (US); Durgaprasad Nagalla, Woburn, MA (US); Venkatesh Mohanraj, Lexington, MA (US)

(73) Assignee: Bottomline Technologies, Inc., Portsmouth, NH (US)

( * ) Notice: Subject to any disclaimer, the term of this patent is extended or adjusted under 35 U.S.C. 154(b) by 262 days.

(21) Appl. No.: 14/305,262

(22) Filed: Jun. 16, 2014

(65) Prior Publication Data

US 2014/0298433 A1  Oct. 2, 2014

Related U.S. Application Data

(63) Continuation-in-part of application No. 13/754,990, filed on Jan. 31, 2013, which is a continuation of
(Continued)

(51) Int. Cl.
*G06F 7/04* (2006.01)
*G06F 12/00* (2006.01)
(Continued)

(52) U.S. Cl.
CPC ........... *H04L 63/08* (2013.01); *G06F 3/04883* (2013.01); *H04L 63/083* (2013.01); *H04L 63/0876* (2013.01)

(58) Field of Classification Search
CPC ........ G06F 21/31; G06F 21/36; G06F 3/0362; G06F 3/041; G06F 3/04883; G06F 21/83; G06F 3/03547; G06F 3/0346
(Continued)

(56) References Cited

U.S. PATENT DOCUMENTS 5,559,961 A  9/1996 Blonder
6,256,737 B1  7/2001 Bianco et al.
(Continued)

OTHER PUBLICATIONS

Co-pending U.S. Appl. No. 13/135,507, filed Jul. 7, 2011.
Co-pending U.S. Appl. No. 13/754,990, filed Jan. 31, 2013.

*Primary Examiner* — Douglas Blair
*Assistant Examiner* — Imran Moorad
(74) *Attorney, Agent, or Firm* — Renner, Otto, Boisselle and Sklar LLP

(57) ABSTRACT

According to an aspect, a computing device includes a processor; a computer readable memory; a display screen; a touch sensitive panel overlying the display screen; and computing device application instructions coded in the computer readable memory and executed by the processor to: display a user-selectable photograph on the display screen, the user-selectable photograph including a group of fiducials, generate captured pattern data, the captured pattern data representing coordinate values on the touch sensitive panel where touched by a user, and provide for authentication of the user based on a comparison of the captured pattern data and respective locations of the group of fiducials included in the user-selectable photograph.

21 Claims, 8 Drawing Sheets

Related U.S. Application Data application No. 13/135,507, filed on Jul. 7, 2011, now Pat. No. 8,776,213.

(51) Int. Cl.

| | | |
|---|---|---|
| *G06F 12/14* | (2006.01) |
| *G06F 13/00* | (2006.01) |
| *G06F 17/30* | (2006.01) |
| *G06F 3/041* | (2006.01) |
| *G06F 3/045* | (2006.01) |
| *G06F 3/042* | (2006.01) |
| *G06F 3/043* | (2006.01) |
| *G06F 3/033* | (2013.01) |
| *H04L 29/06* | (2006.01) |
| *G06F 3/0488* | (2013.01) |

(58) Field of Classification Search
USPC .................................. 726/17; 345/173–179
See application file for complete search history.

(56) References Cited

U.S. PATENT DOCUMENTS

| | | | |
|---|---|---|---|
| 7,174,462 B2 | 2/2007 | Pering et al. | |
| 7,992,202 B2* | 8/2011 | Won | G06F 21/36 |
| | | | 345/173 |
| 8,392,975 B1 | 3/2013 | Raghunath | |
| 8,638,939 B1 | 1/2014 | Casey et al. | |
| 8,650,624 B2 | 2/2014 | Griffin et al. | |
| 2002/0056043 A1 | 5/2002 | Glass | |
| 2003/0083764 A1 | 5/2003 | Hong | |
| 2007/0277224 A1 | 11/2007 | Osborn et al. | |
| 2009/0140838 A1 | 6/2009 | Newman et al. | |
| 2009/0201257 A1* | 8/2009 | Saitoh | G06F 3/03547 |
| | | | 345/173 |
| 2009/0313693 A1 | 12/2009 | Rogers | |
| 2010/0130181 A1* | 5/2010 | Won | H04M 1/67 |
| | | | 455/414.1 |
| 2010/0169958 A1 | 7/2010 | Werner et al. | |
| 2010/0225443 A1* | 9/2010 | Bayram | G06F 21/316 |
| | | | 340/5.83 |
| 2011/0070864 A1* | 3/2011 | Karam | G06F 21/34 |
| | | | 455/411 |
| 2011/0145587 A1* | 6/2011 | Park | G06F 21/36 |
| | | | 713/182 |
| 2012/0124662 A1* | 5/2012 | Baca | G06F 21/32 |
| | | | 726/17 |
| 2012/0127102 A1* | 5/2012 | Uenohara | G06F 3/0486 |
| | | | 345/173 |

* cited by examiner

| User Directory 20 | | | | | | | | | |
|---|---|---|---|---|---|---|---|---|---|
| Login ID 40 | PW 42 | Device ID 44 | GI-1 46a | GI-2 46b | GI-3 46c | GI-4 46d | Key Image 48 | Static Coordinates 50 | Trace Pattern Verification Data 52 |
| | | | | | | | ID-46d | | |
| | | | | | | | | | |
| | | | | | | | | | |
| | | | | | | | | | |

Figure 2

| Trace Pattern Verification Data 42 | | | | | | |
|---|---|---|---|---|---|---|
| Index 58 | Coordinate 60 | | Time 62 | Radius 64 | Location 65 | Angle 66 |
| | X | Y | | | | |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |

Figure 4

| Initial Authentication Request 112 |
|---|
| Device Identifier 116 |
| User ID 118 |
| Encrypted Password 120 |

| Authentication Package 122 |
|---|
| Trace Pattern Data 124 |
| ID of Selected Image 126 |
| ID of Static Coordinates 128 |
| Device ID 129 |

Figure 7B

| Captured Trace Pattern Data 124 | | | | | | |
|---|---|---|---|---|---|---|
| Index 128 | Coordinate 130 | | Time 132 | Radius 134 | Location 135 | Angle 137 |
| | X | Y | | | | |
| 1 | | | | | | |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | |
| 12 | | | | | | |

APPLICATION SECURITY SYSTEM AND METHOD

TECHNICAL FIELD

The present invention relates to security for applications operating on a computing device and more particularly to authenticating the user of a computing device.

BACKGROUND OF THE INVENTION

Authenticating a user of a computing device in order to provide access to restricted electronic data or access to restricted services such as banking services is critical for securing data and preventing fraud.

The most common system for authenticating a user is to require the user to enter a user ID and password combination. The password is then compared to a valid password that is stored in a secure location in association with the user ID.

If the user ID and password tendered by the user matches the valid password stored in association with the user ID, the user is granted access to the restricted electronic data or systems. On the other hand, if the user ID does not match a valid user ID's or the password does not match the valid password stored in association with the user ID, the user is denied access.

User ID and password systems are not considered the most secure because it is based solely on the person purporting to be the authorized user having knowledge of the user ID and password. Another individual who has knowledge of the user ID and password can gain access to the restricted systems.

Digital certificates also provide enhanced security. When using a digital certificate, a combination of a user entered User ID, user entered password, and a digital certificate are required to authenticate to the server. The digital certificate may be loaded onto the client computing device used to access the server or loaded to a hardware key that is coupled to the computing device at the time the user uses the computing device to access the server. Security is considered enhanced because access to the system requires not only knowledge of the user ID and password but also requires possession of the digital certificate.

Biometric measuring systems also provide enhanced security. Security is considered enhanced because access to the system further requires that the person attempting to gain access have the same biometric characteristics that are being measured as the authentic user (i.e. same finger print, same iris pattern, etc). Because certain biometric characteristics that are typically used for security are unique to each individual, it is extremely difficult for a different person replicate the biometric characteristic of the authentic user.

A challenge with use of biometrics for security and to restrict access to services is that biometric measuring devices are expensive and most biometric measuring devices are no readily portable.

In the field of computing devices, device locking mechanisms also provide security by restricting who may use the device to access electronic data to which the device has access. The most common method for unlocking a device is entry of a passcode. As with a password, it restricts based on knowledge and any individual with knowledge of the passcode can access the device. More recently, a system has been developed for mobile computing devices wherein a group of nine (9) position indicators are arranged in a tic-tac-toe pattern on a display with an overlaying touch sensitive panel. The device is unlocked by the user tracing a predetermined pattern across at least a portion of the nine (9) position indicators.

Phishing is a practice of using a fraudulent website that has the appearance of a genuine website to induce a person to provide his or her user ID and password to the operator of the fraudulent website. The operator of the fraudulent website has knowledge of the user ID and password combination and can gain access to the genuine website and the restricted electronic data or services provided by the genuine website. If the genuine website is a financial institution's banking application, the fraudster could gain access the user's account on the genuine website.

In an effort to thwart phishing, some websites utilize a site key as part of the login-authentication process. More specifically, when a user reaches the genuine web site, for example an internet banking web site, he/she is prompted to enter his/her user name only—not both user name and password. If the user ID is valid, the web site responds with a site key picture that the user has previously selected as the picture to display at log in. In conjunction with displaying the picture, the website displays the control for the user to enter his/her password. Also displayed is a prominent warning instructing the user to not enter his/her password if the site key picture is not correct.

This system reduces phishing fraud because it prevents replication of the genuine web site log-in process on a fraudulent website. More specifically, although the operator of a fraudulent web site can replicate the genuine website to induce the person to enter his or her user ID, the operator of the fraudulent website does not have access to the user's personally selected site key picture and therefore cannot replicate the genuine site's ability to display the personally selected site key in association with prompting the user to enter his or her password. Because the typical user becomes accustomed to using the two step log-in process and seeing his/her personally selected site key picture on the genuine web site, the lack of two step log in process and/or the lack of seeing the personally selected site key on a fraudulent web site make its obvious to the user that the website may not be genuine and that he or she should not provide their password.

It should be appreciated that a site key does not prevent access to the website so long as the user attempting to authenticate has the correct user ID and password. The site key system simply lowers the probability that a user will fall prey to a phishing scam and inadvertently provide his or her password to a fraudster.

What is needed is an improved system and method for authenticating the user of a device that does not rely on simply a user ID and password, digital certificates or biometric measuring systems.

SUMMARY OF THE INVENTION

According to an aspect, a computing device includes a processor; a computer readable memory; a display screen; a touch sensitive panel overlying the display screen; and computing device application instructions coded in the computer readable memory and executed by the processor to: display a user-selectable photograph on the display screen, the user-selectable photograph including a group of fiducials, generate captured pattern data, the captured pattern data representing coordinate values on the touch sensitive panel where touched by a user, and provide for authentication of the user based on a comparison of the captured pattern data and respective locations of the group of fiducials included in the user-selectable photograph.

According to another aspect, the computing device application instructions are executed by the processor to initiate comparison of the captured pattern data with trace pattern verification data, the trace pattern verification data comprising coordinate data values representing one or more trace strokes on the touch sensitive panel.

In yet another aspect, the coordinate data values represent a plurality of trace strokes on the touch sensitive panel.

According to another aspect, the plurality of trace strokes have a particular order as part of the comparison.

In still another aspect, the coordinate data values represent three trace strokes on the touch sensitive panel.

In yet another aspect, the one or more trace strokes includes a straight line between a pair of the fiducials included in the user-selectable photograph.

In accordance with another aspect, the one or more trace strokes includes a plurality of straight lines between pairs of the fiducials included in the user-selectable photograph.

According to another aspect, the computing device application instructions are executed by the processor to initiate comparison of the captured pattern data with static coordinate data representing a specific location on the touch sensitive panel.

In another aspect, the the user-selectable photograph is provided by the user.

With still another aspect, the user-selectable photograph is selectable by the user from a display of a plurality of photographs on the display screen.

Alternatively or additionally, the plurality of photographs are provided by the user.

According to another aspect, a method for authenticating a user of a computing device is provided. The computing device includes a processor; a computer readable memory; a display screen; a touch sensitive panel overlying the display screen; and computing device application instructions coded in the computer readable memory and executed by the processor. The method includes displaying a user-selectable photograph on the display screen, the user-selectable photograph including a group of fiducials, generating captured pattern data, the captured pattern data representing coordinate values on the touch sensitive panel where touched by the user, and authenticating the user based on a comparison of the captured pattern data and respective locations of the group of fiducials included in the user-selectable photograph.

According to another aspect, the comparison includes comparing the captured pattern data with trace pattern verification data, the trace pattern verification data comprising coordinate data values representing one or more trace strokes on the touch sensitive panel.

In yet another aspect, the coordinate data values represent a plurality of trace strokes on the touch sensitive panel.

With still another aspect, the plurality of trace strokes have a particular order as part of the comparison.

According to another aspect, the coordinate data values represent three trace strokes on the touch sensitive panel.

In still another aspect, the one or more trace strokes includes a straight line between a pair of the fiducials included in the user-selectable photograph.

With another aspect, the one or more trace strokes includes a plurality of straight lines between pairs of the fiducials included in the user-selectable photograph.

In another aspect, the method includes authenticating the user based on a direction of the captured pattern data.

According to another aspect, the comparison comprises comparing the captured pattern data with static coordinate data representing a specific location on the touch sensitive panel.

According to an aspect, the computing device receives the user-selectable photograph provided by the user.

With still another aspect, the user selecting the user-selectable photograph from a display of a plurality of photographs on the display screen.

In yet another aspect, the plurality of photographs are provided by the user.

Another aspect relates to a system for authenticating the user of a computing device.

The system comprises an authentication server which includes an authorized user directory and an authentication application.

The authorized user directory includes a group of records. Each record is uniquely associated with an authorized user and includes at least a computing device ID value that is a globally unique value assigned to the authorized user's computing device.

The record also includes a group of unique depictions. Each depiction may be a graphic image, picture, grouping of text or alpha numeric characters, or grouping of other visual elements which, in all cases result in display of a group of unique fiducials when the depiction is displayed on a display screen. A fiducial is a display of a unique pattern of pixel color and/or intensity that is recognizable within the depiction.

The record also includes an identification of a key depiction. The key depiction is one of the unique depictions within the group.

The record further includes trace pattern verification data comprised of a group of coordinate values in a sequential order. The group of coordinate values, in sequential order, is representative of the authorized user tracing a pattern comprising a group of sequential continuous trace strokes with each trace stroke being a continuous motion between a pair of the fiducials within the key depiction. In sequence, the group of continuous trace strokes may be referred to as a signature.

The computer device includes a graphic user interface comprising a display screen and a multi-touch sensitive panel overlying the display. An application operating on the computing device generates an authentication request to the authentication server.

In response, the authentication server provides the group of depictions from the record with the device ID that matches the device ID of the computing device sending the authentication request.

The application receives and displays each of the depictions for user identification of the key depiction using the touch sensitive panel. After the user identifies the key depiction, the key depiction is displayed on the screen in a size such that the fiducials are spaced apart sufficient, based on the resolution of the multi-touch sensitive panel, for capture of multi-touch sensitive panel coordinate values as the user inputs a continuous trace stroke pattern between fiducials.

While the key depiction is displayed, the application captures the user input of a continuous trace stroke pattern. More specifically, the application captures continuous trace pattern data comprising a group of sequential coordinate values representing the user trace strokes on the multi-touch sensitive panel over the display of the selected depiction.

The application then sends an authentication package to the authentication server. The authentication package includes the identification of the key depiction and the captured trace pattern data.

The authentication server authenticates the user if the identifier of the key depiction is correct and if the group of sequential continuous trace strokes represented by the sequential coordinate values of the captured trace pattern data matches the group of sequential continuous trace strokes between unique pairs of fiducials within the key depiction.

Is should be appreciated that the foregoing provides for two factor authentication in that the authorized user must have possession of the computing device with the device ID number matching the record and the user must know which of the depictions is the key depiction and know the selected trace pattern.

To add a third factor for authentication, physical characteristics of the person may be used. For purposes of illustrating the present invention, the physical characteristic may be: i) an additional static contact point on a multi-touch sensitive panel (i.e. a panel capable of providing touch coordinates for more than one touch point simultaneously); ii) the authorized user's finger tip diameter as measured on the touch sensitive panel while the authorized user is drawing the continuous trace pattern; iii) the authorized user's signature velocity as measured on the touch sensitive panel when drawing the continuous trace pattern; and iv) the authorized user's direction of contact on the touch panel while drawing the continuous trace pattern.

More specifically, with respect to static contact, each record of the user directory may further include an authentic static coordinate value that is distinct from the authentic static coordinate value of each other user record. The computing device detects static contact with the multi-touch sensitive panel while simultaneously detecting coordinates as the user trace strokes are formed on the multi-touch sensitive panel. A captured static coordinate value identifies location of the static contact.

The authentication application generates the message to authorize the protected functions only if the captured static coordinate matches the authentic static coordinate value.

More specifically, with respect to fingertip size, a verification radius value may be associated with each coordinate value of the trace pattern verification data of each user record. The computing device associates a measured radius value with each coordinate value of the captured trace pattern data. The measured radius value may represent size of contact which was made with the touch sensitive panel at the coordinate value. The authentication application generates the message to authorize the protected functions only if a radius verification value derived from the measured radius values associated with coordinate values of the captured trace pattern data matches, within a threshold, an authentic radius verification value derived from the verification radius values of the trace pattern verification data.

More specifically, with respect to velocity, a verification time stamp is associated with each coordinate value of the trace pattern verification data of each user record.

The computing device associates a measured time stamp with each coordinate value of the captured trace pattern data. The measured time stamp represents a time at which contact was made with the touch sensitive panel at the coordinate value.

The authentication application further: i) calculates at least one velocity verification value for at least one trace stroke, the velocity verification value being a function of a change in time between verification time stamps of at least two coordinate values of the trace pattern verification data which represents the trace stroke; ii) calculates a measured velocity value for the trace stroke, the measured velocity value being a function of a change in time between measured time stamps of at least two coordinate values of the captured trace pattern data which represents the trace stroke; and iii) generates the message to authorize the protected functions only if the measured velocity value matches, within a threshold, the velocity verification value.

More specifically, with respect to direction, the authentication application: i) calculates at least one direction verification value for at least one trace stroke; ii) calculates a measured direction value for the trace stroke; and iii) generates the message to authorize the protected functions only if the measured direction value matches, within a threshold, the direction verification value.

The direction verification value may be a function of displacement between at least two coordinate values of the trace pattern verification data which represents the trace stroke. The two coordinates may be sequential. Because a trace stroke may be curved, the function of displacement may also be a function of intermediate coordinates with reflect the curvature. For example, displacement between 1,1 and 4,3 may include intermediate coordinates reflecting more of an over 3, up 2 curve or reflecting more of an up two, over 3 curve.

Similarly, the measured direction value may be a function of displacement between at least two coordinate values of the captured trace pattern data which represents the trace stroke. Again, the two coordinates may be sequential and again, because a trace stroke may be curved, the function of displacement may also be a function of intermediate coordinates with reflect the curvature. For example, displacement between 1,1 and 4,3 may include intermediate coordinates reflecting more of an over 3, up 2 curve or reflecting more of an up two, over 3 curve.

For yet additional security: i) each user record of the user directory further includes a unique user ID and password; ii) The computing device further obtains from the user a tendered user ID and tendered password; and iii) the authentication application only provides each depiction of the group of depictions if the tendered user ID and the tendered password, provided by the authenticating computing device, match the user ID and password of the user record with the computing device ID value which matches the device identifier.

BRIEF DESCRIPTION OF THE DRAWINGS

FIG. 2 is a table diagram representing a user directory in accordance with an exemplary embodiment of the present invention;

FIG. 4 is a table diagram representing trace pattern verification data in accordance with an exemplary embodiment of the present invention;

FIG. 7*a* is a diagram representing an initial authentication request in accordance with an exemplary embodiment of the present invention;

FIG. 7*b* a diagram representing a confirmation authentication request in accordance with an exemplary embodiment of the present invention;

FIG. 8 is a table representing captured trace pattern data in accordance with an exemplary embodiment of the present invention.

DETAILED DESCRIPTION OF THE INVENTION

Figure 1:
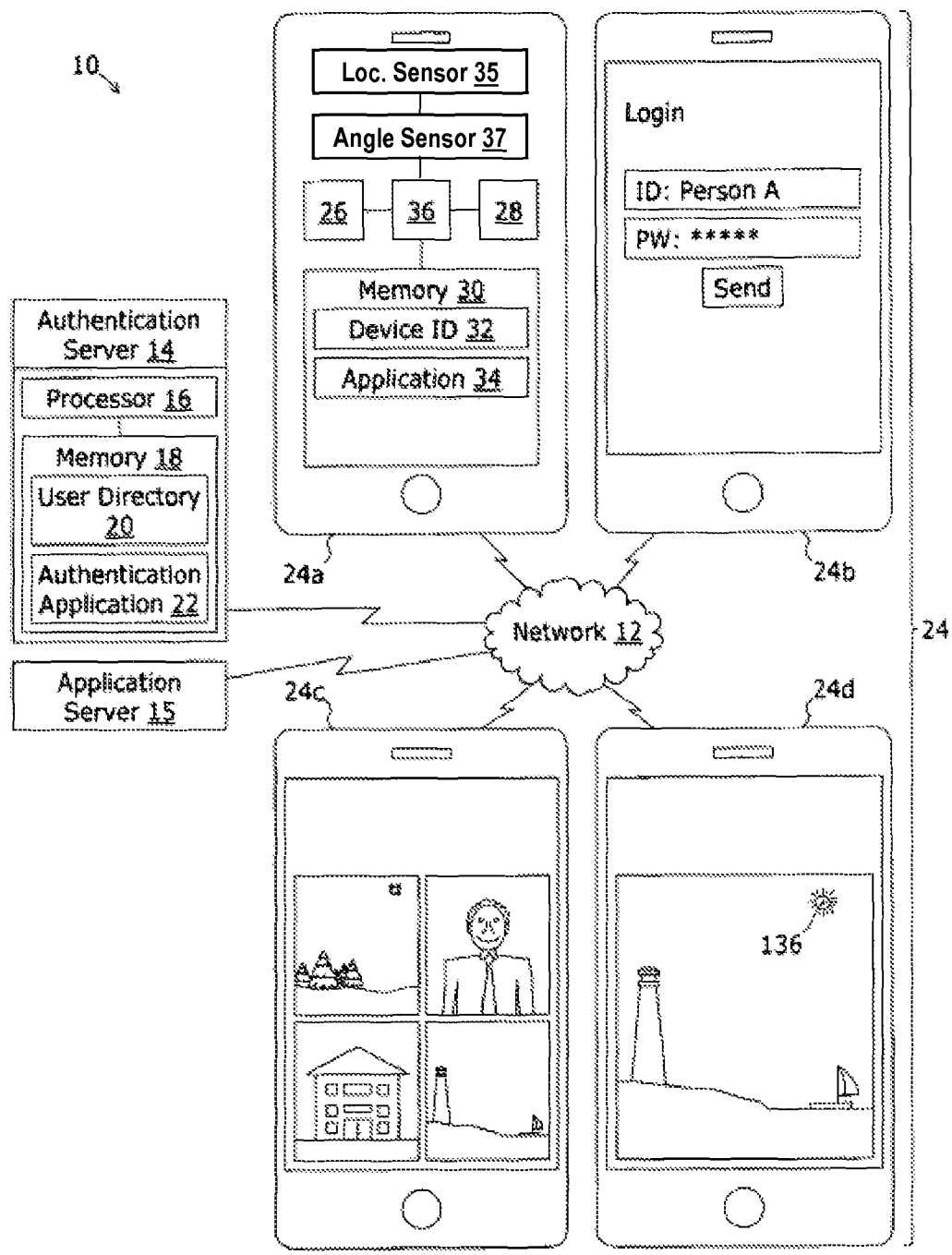
FIG. 1 is a block diagram representing architecture of a system for authenticating a user of a computing device in accordance with an exemplary embodiment of the present invention.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code/instructions which is encoded within computer readable media (volatile memory, non volatile memory, magnetic media, RAM, ROM, Flash, ect) accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that table structures represented in this application are exemplary data structures only and intended to show the mapping of relationships between various data elements. Other table structures may store similar data elements in a manner that maintains the relationships useful for the practice of the present invention.

Within this application the applicant has depicted and described groups of certain elements. As used in this application, the term group means at least three of the elements. For example, a group of records means at least three records. The use of the term unique with respect to an element within a group or set of elements means that that the element is different than each other element in the set or group.

Within this application, the applicant has used the term database to describe a data structure which embodies groups of records or data elements stored in a volatile or non volatile storage medium and accessed by an application, which may be instructions coded to a storage medium and executed by a processor. The application may store and access the database.

Within this application, the applicant has used the term threshold to describe matching of captured data to verification data in several aspects. Such a threshold may be a predetermined threshold, a threshold calculated from the verification data itself, or a threshold which is a function of comparing the verification data to multiple instances of captured data—wherein deviation of the captured data over such multiple instances is used for determining the threshold for matching on a prospective basis (i.e. learning how far the authorized user typically deviates from the verification data).

Turning to FIG. 1, an exemplary architecture 10 of a system for authenticating a user of a computing device comprises an authentication server 14 and a group of computing devices 24.

The server 14 comprises a processor 16 coupled to computer readable memory 18. The computer readable memory 18 comprises a user directory database 20 and an authentication application 22. The server 14 is coupled to a network 12, such as the public internet or an ISP provider's network—which in turn is coupled to the Internet, through which the sever 14 communicates with each computing device 24*a*-24*d* of the group of computing devices 24.

Each computing device 24*a*-24*d* may be a mobile computing device such as a PDA, telephone, iPad™ or other device with an embedded operating system such as iOS, Android, or BBOS.

Each of the computing devices 24*a*-24*d*, using computing device 24*a*, which is shown in block diagram form, as an example, includes a display 26 and an overlaying multi-touch sensitive panel 28 which together comprise a graphical user interface and a processor 24 coupled to a computer readable memory 30 and each of the display 26 and the overlaying multi-touch sensitive panel 28. The overlaying multi-touch sensitive panel 28 is capable of detecting contact at multiple points simultaneously. However, it should also be appreciated that certain aspects of this invention could be practiced utilizing a computing device that includes a touch sensitive panel which is not multi-touch.

The computing devices 24*a*-24*d* may also include a location sensor 35 in communication with a processor 36 of the computing device 24. The location sensor 35 may provide a measured location value (e.g., a longitude and latitude) of the computing device 24. For example, the location sensor 35 may be a global positioning system (GPS) receiver, a Global Navigation Satellite System device, a Galileo positioning system device, a Compass navigation system device, an Indian Regional Navigational Satellite System device, or any other suitable device. Upon receiving a request for a physical location, the location sensor 35 provides to the computing device 24 a measured geolocation based on the output of the location sensor 35.

Alternatively, the location sensor 35 may determine the measured geolocation of the computing device 24 using an IP address, cellular triangulation, multilateration of radio signals, Wi-Fi triangulation, or using any other suitable means.

The computing devices 24*a*-24*d* may alternatively or additionally include an angle sensor 37 in communication with a processor 36 of the computing device 24. The angle sensor 37 provides a measured angle value of the computing device 24. The angle sensor 37 may include one or more accelerometers and gyroscopes and may produce an output representative of forces acting along the sense axis of each accelerometer and gyroscope. As an example, if the angle sensor 37 includes three accelerometers and three gyroscopes, the angle sensor 37 would output six total outputs, one for each accelerometer and one for each gyroscope. As will be understood by one of ordinary skill in the art, the angle sensor 37 is not limited to accelerometers and gyroscopes, but may include other sensors (e.g., other sensors capable of sensing forces acting on the angle sensor 37 or the position of the angle sensor 37).

The computer readable memory 30 may comprise a combination of both volatile and non volatile memory, including volatile and non volatile memory within integrated components such as a wireless communication system used to communicate with the server 14 via the network 12.

Coded to the memory are: i) the embedded operating system (not shown) which includes applicable firmware and drivers for the display 28, overlaying multi-touch sensitive panel 28, and wireless communication system; ii) a unique device ID 32; and iii) an application 34.

The device ID 32 may be a globally unique MAC address associated with the wireless communication system.

The application 34 is of a nature wherein authentication to the authentication server 14 is required for the user to gain access to certain application functions provided by an application server 15. An example of such an application 34 is a banking application wherein multi-layer authentication is required with a first layer of authentication be performed before the user would be permitted to view financial information and a second layer of authentication being performed before the user would be permitted execute financial transactions or access other restricted functions.

Turning to FIG. 2, an exemplary user directory 20 is depicted. The user directory includes a group of user records 38. Each user record of the group of user records 38 is associated with a unique authorized user.

Each user record associates the authorized user with: i) a login ID 40 and password 42; ii) a verified device ID 44; iii) a group of depictions 46a-46d; iii) identification of a key depiction 48, the key depiction being a single depiction selected from the group of depictions 46a-46d within the user record; iv) identification of an authentic static coordinate 50; and iv) trace pattern verification data 52.

The login ID 40 and password 42 may each be character strings (or encrypted representations of character strings) that must be provided by the user as part an initial authentication process.

The verified device ID 44 may be the unique device ID 32 of the computing device assigned to the authorized user which, as discussed, may be the MAC address of such computing device.

The group of depictions 46 includes at least four unique depictions 46a-46d. Each depiction may be a graphic image, digital photographs, grouping of text or alpha numeric characters, or grouping of other visual elements which, in each case, results in display of a group of unique fiducials when the depiction is displayed on the display screen 26 of a computing device 24. A fiducial means a display of a unique pattern of pixel color and/or intensity that is recognizable within the depiction.

Figure 3:
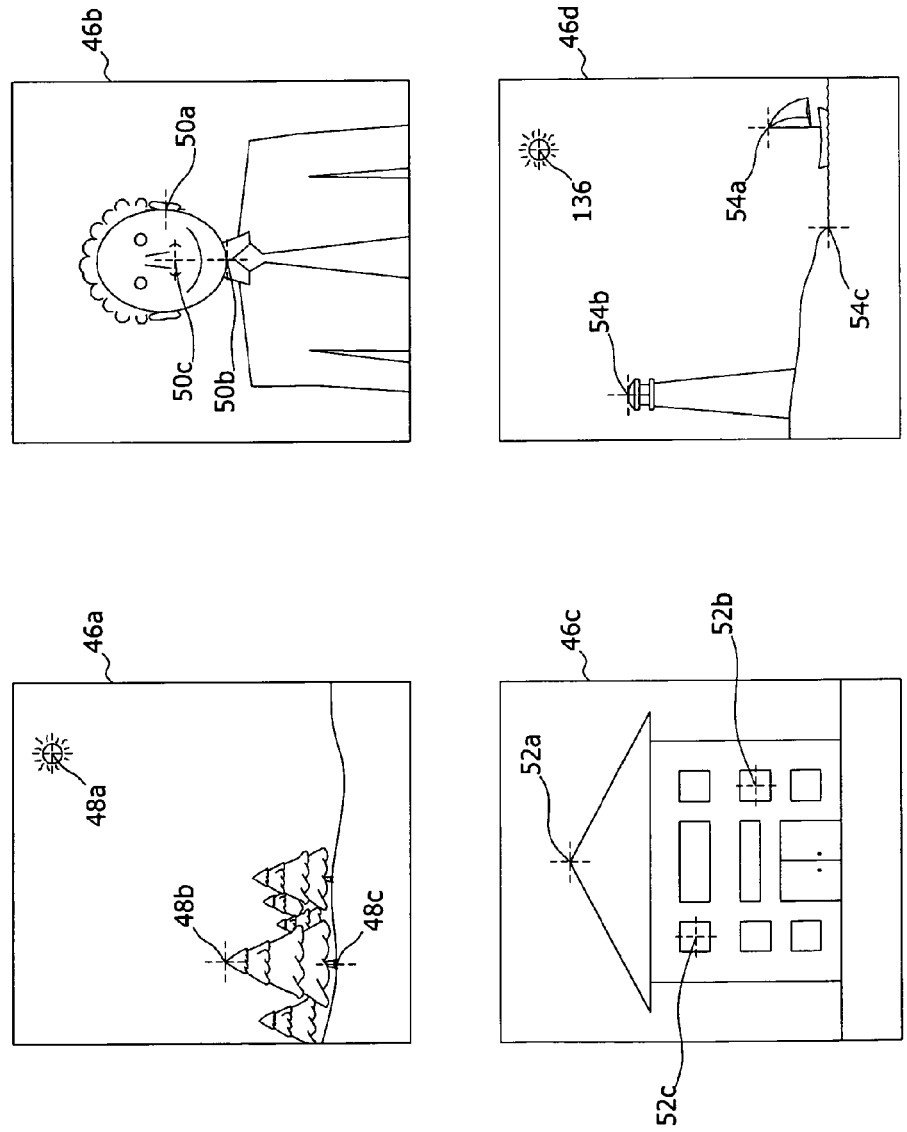
FIG. 3 is a diagram representing a group of depictions in accordance with an exemplary embodiment of the present invention.

Turning to FIG. 3, exemplary depiction 46a is a graphic image or photograph of a landscape which, when displayed, results in the pattern of pixel color and/or intensity recognizable as the image of the sun being a first unique fiducial 48a, the pattern of pixel color and/or intensity recognizable as the top of the tree being a second unique fiducial 48b, and the pattern of pixel color and/or intensity recognizable as the base of the tree being a third unique fiducial 48c.

Similarly display of depiction 46b results in the pattern of pixel color and/or intensity recognizable as the image of the ear being a first unique fiducial 50a, the pattern of pixel color and/or intensity recognizable as the chin being a second unique fiducial 50b, and the pattern of pixel color and/or intensity recognizable as the nose being a third unique fiducial 50c.

Similarly display of depiction 46c results in the pattern of pixel color and/or intensity recognizable as the image of the top of the house being a first unique fiducial 52a, the pattern of pixel color and/or intensity recognizable as the left window being a second unique fiducial 52b, and the pattern of pixel color and/or intensity recognizable as the right window being a third unique fiducial 52c.

Similarly display of depiction 46d results in the pattern of pixel color and/or intensity recognizable as the image of the top of the light house being a first unique fiducial 54a, the pattern of pixel color and/or intensity recognizable as the top of the sail being a second unique fiducial 54b, and the pattern of pixel color and/or intensity recognizable as the point where the ocean meets the shore being a third unique fiducial 54c.

As will be described in more detail later, the fiducials of each depiction are useful in that when a depiction is displayed on the display screen of a computing device, the user can identify a specific coordinate on the display screen by identifying the distinct feature of the fiducial associated with that coordinate.

Further, each fiducial within each depiction 46a-46d may be at a coordinate location that is unique from each the fiducials of each other depiction. For example, if depiction 46a is displayed on the display screen of a device, the coordinates on the display screen where each fiducials 48 exists may be at different coordinates on the display screen then where fiducials from each other depiction would be displayed, if such other depictions were displayed on the display screen.

The group of depictions 46 for an authorized user associated with a user record are unique/different from the group of depictions 46 for each other user record associated with a different authorized user. Stated another way, the group of depictions 46 for each authorized user are uniquely personal. The group of depictions 46 associated with an individual may be a group of personal photographs uploaded by that person or it may be a personal subgroup of depictions selected from a larger group of available stock depictions.

Returning to FIG. 2, the key depiction identifier 48 of each user record identifies a selected depiction, the selected depiction being only one of the depictions of the group of depictions 46a-46d of that user record. As will be discussed in more detail, the selected or key depiction is the one depiction that must be identified and selected by the user as part of the confirmation authentication process.

Returning to FIG. 2, the authentic static coordinate 50 identifies a specific location within the key depiction (for example location 136 within depiction 46d as represented in FIG. 3). More specifically the authentic static coordinate 50 identifies the location 136 on the display 26 and overlaying multi-touch sensitive panel 28 (for example by a Cartesian coordinate in an x,y format) which is recognizable by the display of specific content of the depiction at that coordinate when the depiction is rendered on the display 26. As will be discussed in more detail, the user is expected to maintain touch contact with the location 136 corresponding to the authentic static coordinates 50 while authenticating.

Turning to FIG. 4, the trace pattern verification data 42 may be represented by a group of records 56 within a database table. Each record includes identification of a verification coordinate 60 which may be a coordinate position within the key depiction (for example a Cartesian coordinate in an x,y format).

The group of verification coordinates, in sequential order, as indicated by the index numbers 58, represents a group of sequential continuous trace strokes. Each continuous trace stroke of the group of sequential trace strokes may be between a unique pair of fiducials of the group of fiducials within the selected or key depiction.

For example, referring to FIG. 3, if the selected depiction is depiction 46d the records 56 of the trace pattern verification data 42 may represent, in sequential order: i) a first continuous trace stroke commencing at fiducial 54b (top of lighthouse) and terminating at fiducial 54a (top of sail), the first continuous trace stroke being represented by records 1-5; ii) a second continuous trace stroke commencing at fiducial 54a and terminating at fiducial 54c (point where ocean meets land), the second continuous trace stroke being represented by records 5-7; and iii) a third continuous trace stroke commencing a fiducial 54c and terminating at fiducial 54b, the third continuous trace stroke being represented by records 7-10.

For purposes of authenticating, the user is expected to trace a pattern over the key depiction that is the same as the trace pattern represented by the trace pattern verification data 42. More specifically, the user is expected to make contact with the coordinates defined in each record of the trace pattern verification data 42, in sequential order, using the overlaying multi-touch sensitive panel 28 when the selected depiction is displayed on the user's computing device. Further, while the user is tracing the pattern, the user is expected to maintain touch contact location 136 corresponding to the authentic static coordinates 50.

Returning to FIG. 4, each record of the trace pattern verification data 42 may also include identification of a verification time, or time stamp, 62 identification of a verification radius 64, identification of a verification location 65, and/or identification of a verification angle 66. The verification time may be used to determine a verification velocity and direction for at least one trace stroke and the verification radius may be used to determine a verification finger contact radius/pressure on the overlaying multi-touch sensitive panel. The verification location may be used to determine a verified location(s) of the user and the verification angle may be used to determine a verification orientation or angle of the touch sensitive panel.

Figure 5:
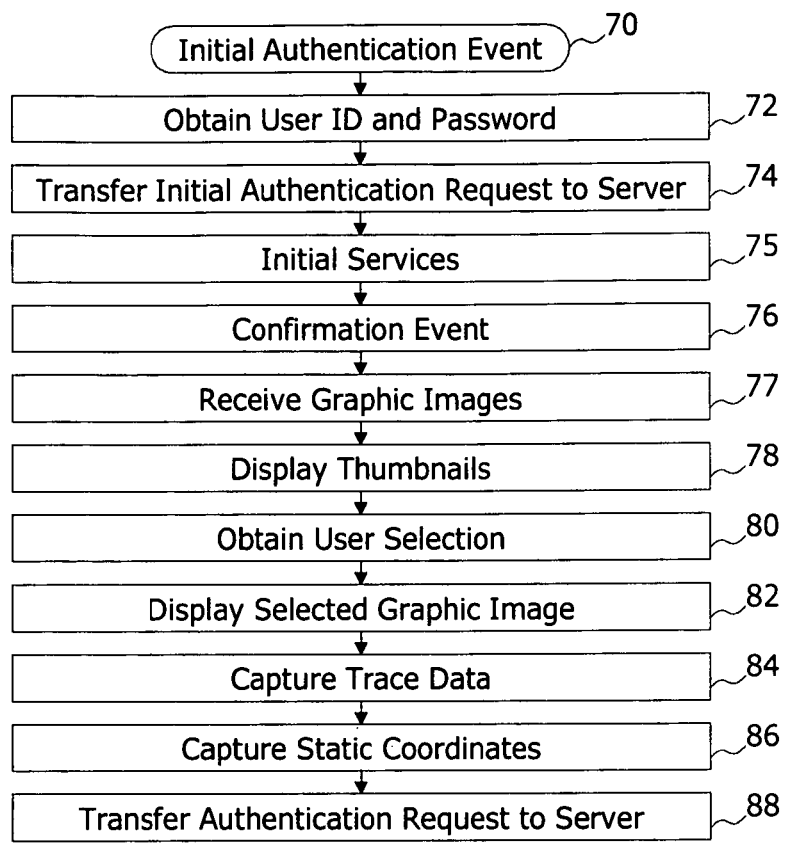
FIG. 5 is a flow chart representing operation of a application on a computing device in accordance with an exemplary embodiment of the present invention.
Figure 6:
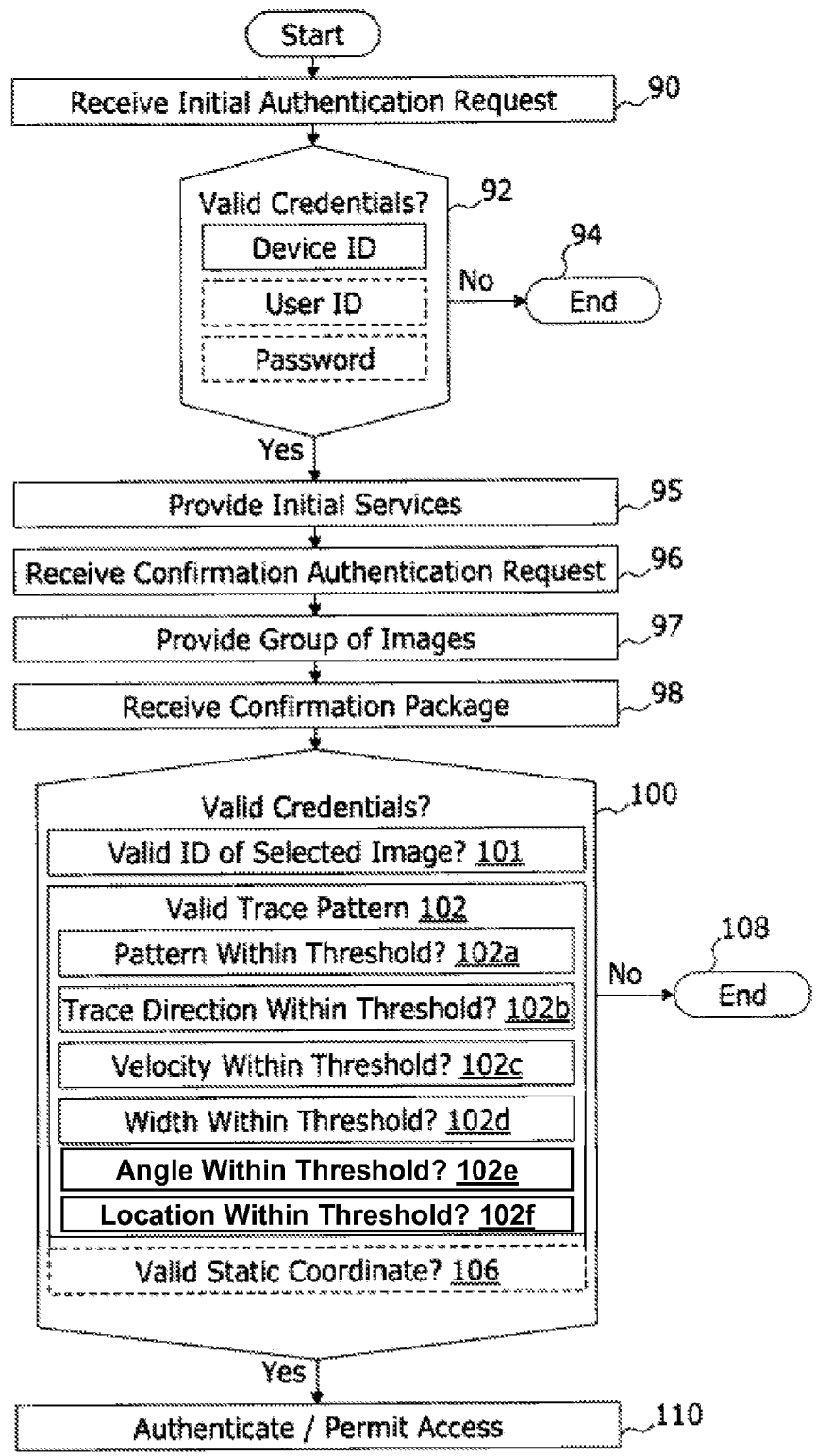
FIG. 6 is a flow chart representing operation of an authentication application of an authentication server in accordance with an exemplary embodiment of the present invention.

FIG. 5 depicts a flow chart representing exemplary operation of the application 34 of the computing device 24 and FIG. 6 depicts a flow chart representing exemplary operation of the authentication application 22 of the authentication server 14.

Turning to FIGS. 5 and 6 in conjunction with FIG. 1, operation commences upon the occurrence of an initial authentication event 70 as depicted in FIG. 5. The initial authentication event 70 may be the user's initial log-in attempt to access services provided by the application 34 and the application server 15.

In response to the initial authentication event 70, the application 34, at step 72, may generate a display on the graphic user interface of the device 24 as depicted on the display of device 24b of FIG. 1 to obtain user input of a user ID and password.

Step 74 represents transfer of an initial authentication request to the authentication server 14. Turning briefly to FIG. 7a, the initial authentication request 112 may include a plurality of fields 114. The fields 114 may comprise: i) a tendered device ID 116 which, as discussed, may be the MAC address of the computing device; ii) a tendered user ID 118 which is the user ID input by the user at step 72 of FIG. 5; and iii) a tendered password 120 which may be the password input by the user at step 74 of FIG. 5; or in each case an encrypted or hashed representation of such information.

If hashing is used, for example a salt hash, the result of the hash for the login ID 40, password, 42, and device ID 44 is stored in the user directory 20. Similarly, the mobile application 34 performs the same hash and includes in the initial authentication request 112 the result of the hash for the tendered device ID 116, tendered user ID 118, and tendered password 120.

Further, transport layer encryption, such as SSL implemented by use of certificate authority services available with the operating system of the computing device, may be used for transfer of the initial authentication request 112 to the authentication server 14.

Turning to FIG. 6, step 90 represents the authentication application 22 of the authentication server 14 receiving the initial authentication request 112 from the computing device 24.

At step 92 the authentication application 22 determines whether the credentials provided in the initial authentication request 112 are valid. More specifically, the tendered user ID 118, tendered password 120, and tendered device ID 116 must all match the login ID 40, password 42, and authentic device ID 44 of a single user record 38 of the user directory 20 (FIG. 2). Stated differently, the credentials provided in the initial authentication request 112 are valid only if the tendered user ID 118 and tendered password 12 match the user ID 40 and password 42 of the user record with a device ID 44 which matches the tendered device ID 116.

If the tendered credentials are not valid, authentication is terminated as represented by step 94.

If the credentials are valid, initial services are authorized by the authentication application 22 at step 95 and initial services are provided by the application 34 as depicted by step 75. More specifically, using the example where the application 34 is a banking application, the authentication application 22 may generate a message to an application server 15 such as a banking application server authorizing access for exchange of account information.

Referring again to FIG. 5, at some point in the application work flow a confirmation authentication event may occur as depicted by step 76. In the banking example, the confirmation authentication event may be associated with the user attempting to approve a payment or a batch of payments using his or her computing device.

In response to this event, either the application 34 or the application server 15 may generate a confirmation authenticating request to the authentication application 22. Step 96 of FIG. 6 represents the authentication application 22 receiving the confirmation authentication request from either the application 22 or the application server 15.

In response thereto, the authentication application 22 provides to the application 34 each depiction of the group of depictions 46 included in the authenticating user record at by step 97. The authenticating user record means the user record 38 of the user directory 20 to which the credentials provided in the initial authentication request match. Stated another way, the authentication application 22 provides to the application each depiction of the group of depictions associated with the device ID value that matches the device identifier of the authenticating device.

Returning to the flow chart of FIG. 5, step 77 represents the application 34 receiving the group of depictions from the authentication server 14. In response thereto, the application 34 may simultaneously displays each depiction of the group of depictions on the display screen 26 of the device 24 as represented by step 78. The display may be in a format commonly known as thumb-nail format. Simultaneous display of the group of depictions in thumbnail format is depicted by computing device 24b of FIG. 1.

Step 80 represents the application 34 detecting user activation of the multi-touch sensitive panel 28 to identify the key depiction. More specifically, each depiction is displayed at a predetermined location on the display 26 with overlaying multi-touch sensitive panel 28. User selection may be detected by detecting at which predetermined location (i.e. which depiction displayed at the predetermined location) the user makes contact with the multi-touch sensitive panel to indicate depiction selection.

Step 82 represents the application displaying the key depiction as a full size depiction on the display screen 26, in a size sufficient for the resolution of the overlaying multi-touch sensitive panel 28 to be able to capture user input of the trace pattern between the fiducials using his or her finger. Such a display is depicted by computing device 24d of FIG. 1.

Step 84 represents the application 34 capturing user trace stroke coordinates through the overlaying multi-touch sensitive panel 28. More specifically, as part of authentication the user is expected to trace the same continuous trace strokes, in the same sequential order, between the same fiducials as represented by the trace pattern verification data 42 of the authentic user record. For authentication to occur, the captured trace stroke pattern must match, within a threshold of error, the trace pattern as represented by the trace pattern verification data 42 of the authentic user record.

Referring briefly to FIG. 8, the captured the trace pattern data 124 may be represented by a group of records 126 within a database table. Each record includes identification of a captured coordinate 130 which may be a coordinate position (for example a Cartesian coordinate in an x,y format) within the selected depiction as displayed on the computing device.

The records of the group of records 126, in sequential order as depicted by index numbers 128, represents, when the selected depiction is displayed on the display screen 26a, a continuous trace pattern across the overlaying multi-touch sensitive panel 28 that is formed when the user moves his or her finger in a group of continuous trace strokes in an attempt to authenticate.

Each record of the captured trace pattern data 124 may also include, in association with the coordinate 130 of the record, identification of a measured time, or time stamp, 132 identification of a measured radius 134, identification of a measured geolocation 135, and/or identification of a measured angle 137.

The measured time may be used to determine a measured velocity and/or direction for at least one continuous trace stroke and the measured radius may be used to determine a measured finger contact radius/pressure on the overlaying multi-touch sensitive panel; both for purposes of comparing with the verification time and verification velocity and/or direction derived from verification time stamps 62 and verification radius values 64 of trace pattern verification data 42 (FIG. 4). The measured angle may be used to determine the orientation of the touch sensitive panel when the captured trace pattern data was captured.

Referring to FIG. 3 in conjunction with FIG. 1, it should also appreciated that identification of the fiducials and corresponding coordinates as depicted in FIG. 3 for purposes of describing the present invention. The fiducials, although in the depiction, are not identified by dashed lines or other coordinate indicators on the display screen 26 of the device as depicted by depiction 46d on device 24d FIG. 1. The user, as part of authentication, must know which depictions is the key depiction and must correctly select the key depiction from the thumbnails, know which portions of the selected depiction represent the fiducials at which each continuous trace stroke commences or terminates, know the correct sequence of continuous trace strokes, and then input the correct continuous trace strokes in the correct order; and with the proper verification velocity, direction, and finger touch point diameter.

For example, with respect the depiction of depiction 46d on device 24d of FIG. 1, the authentic user will, without any prompting or other information being provided by the device, know that the top of the light house, the top of the sail, and the transition from ocean to land are fiducials. The authenticating user must also know, without any prompting or other information being provided by the device, that the sequence of continuous trace strokes for authentication are: i) a first continuous trace stroke commencing at the top of lighthouse and terminating at the top of the sail; ii) a second continuous trace stroke commencing at the top of the sail and terminating at the transition from ocean to land; and iii) a third continuous trace stroke commencing at the ocean to land transition and terminating at the top of the light house.

Further, the authenticating user is also expected to maintain touch point contact with the overlaying multi-touch sensitive panel 28 at the location 136 (FIG. 1) that corresponds to authentic static coordinate 50 (FIG. 2) while input of the sequence of continuous trace strokes.

Returning to FIG. 5, step 86 represents the application 34 capturing static contact and simultaneously capturing the trace data. More specifically, the application identifies the coordinates that the user maintains contact with while input of the sequence of trace patterns.

After capturing the trace data and the static coordinate the application 34 builds an authentication package in computer readable memory for transfer to the authentication server 14 at step 88.

Turning briefly to FIG. 7b, an exemplary authentication package 122 comprises: i) the captured trace pattern data 124 as described with respect to FIG. 8; ii) identification of the selected depiction 126 as described with respect to step 80 of FIG. 5; iii) identification of the captured static coordinate 128 as described with respect to step 86 and captured by the application while the user input the continuous trace strokes over the selected depiction; and iv) a device ID 129.

The contents of authentication package 122 may be secured for transportation to the authentication server. Security may include any combinations or permutations of: i) of one-way hashing of certain data elements; ii) use of application layer encryption using implemented by use of certificate key and trust services available with the operating system of the computing device; iii) transport layer encryption, such as SSL implemented by use of certificate authority services available with the operating system of the computing device; or iv) other security techniques known to those skilled in the art.

Returning to FIG. 6, step 98 represents the authentication application 22 receiving the authentication package 122 from the device. At this time the authentication package is a data structure embodied in computer readable memory of the authentication server. Step 100 represents determining whether the authentication credentials therein are valid.

Step 101 represents determining if the identifier of the selected depiction 126 of the authentication package 122 indicates the key depiction 48 of the authenticating record of the user directory 20 (i.e. the record with the device ID 44 which matches the device ID 129 tendered in or with the authentication package).

Step 102 represents determining whether the continuous trace pattern is valid or more specifically determining whether the group of sequential continuous trace strokes represented by the coordinate values of the captured trace pattern data matches, within a threshold, the group of sequential continuous trace strokes between unique pairs of fiducials within the key depiction as represented by the trace pattern verification data 52 of the authenticating record of the user directory 20.

More specifically, sub step 102a represents determining whether the trace pattern performed by the user is within a predetermined threshold of the authentic trace pattern represented by the trace pattern verification data.

Figure 9:
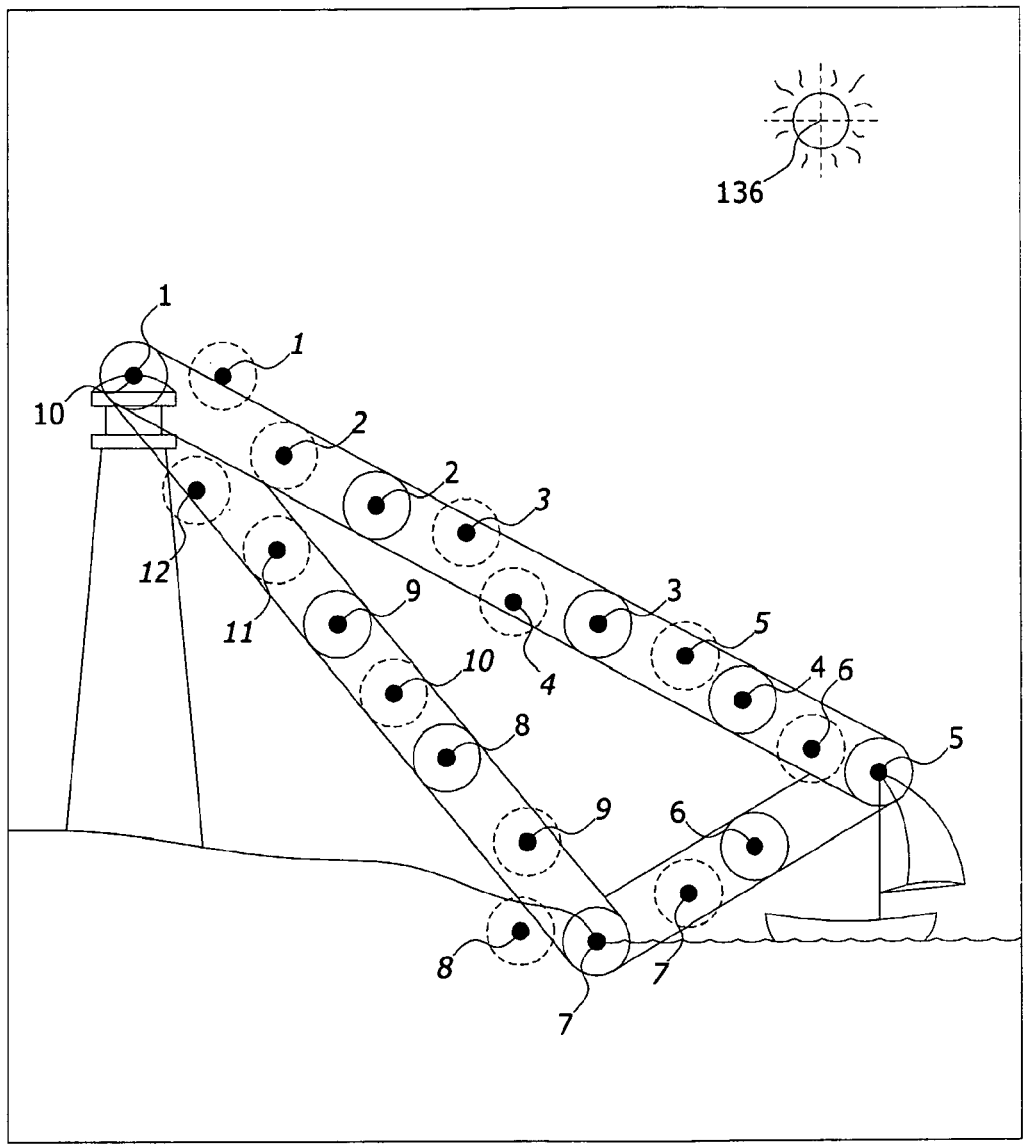
FIG. 9 is a diagram representing authentication of captured trace pattern verification data in accordance with an embodiment of the present invention.

FIG. 9 depicts the coordinates 60 of the trace pattern verification data 42 plotted over the depiction 46d. Each coordinate 60 is labeled with its index number 58 in block text. The solid circle surrounding each coordinate 60 depicts the radius 64 associated with the coordinate.

FIG. 9 further depicts coordinates 130 of the captured trace pattern data 124 plotted over the depiction 46d. Each coordinate 130 is labeled with its index number 128 in italicized text. The dashed circle surrounding each coordinate depicts the measured radius 134 associated with (measured at) the coordinate.

Sub step 102a may represent determining whether displacement between: i) lines formed by connecting the coordinates 60 of the trace pattern verification data; and ii) lines formed by connecting the coordinates 130 of the captured trace pattern data 124 is within an acceptable or predetermined threshold.

Sub step 102b represents determining whether the trace sequence and direction represented by coordinates 130 of the captured trace pattern data matches, within a threshold, the trace stroke sequence and direction of the trace pattern verification data. More specifically, direction of travel at a coordinate 130 may be calculated by determining the displacement between the coordinate 130 and the next coordinate in the sequence. Similarly an authentic direction of travel at a coordinate 60 may be calculated by determining the displacement between the coordinate 60 and the next coordinate in the sequence. Verification of direction may comprise determining whether the direction of travel is within an acceptable or predetermined threshold of authentic direction of travel for at least some of the coordinates 130.

Sub step 102c represents determining whether trace velocity is within a threshold of a trace velocity represented by the trace pattern verification data 52 of the authentic record. More specifically, the authentication application 22 may calculate at least one velocity verification value and at least one measured velocity value, in each case for at least one trace stroke.

The velocity verification value may be a function of elapsed time between verification time stamps of at least two coordinate values representing the trace stroke in the trace pattern verification data 52. More specifically, the velocity verification value may be the elapsed time between the time stamp associated with the coordinate at the commencement of the continuous trace stroke (i.e. at the fiducial at which the trace stroke commences) and the time stamp associated with the coordinate at the termination of the trace stroke (i.e. at the fiducial at which the trace stroke terminates), in each case as represented in the trace pattern verification data.

The measured velocity value may be a function of elapsed time between time stamps of at least two coordinate values representing the trace stroke in the captured trace pattern data 124. More specifically, the measured velocity value may be the elapsed time between the time stamp associated with the coordinate at the commencement of the trace stroke (i.e. at the fiducial at which the trace stroke commences) and the time stamp associated with the coordinate at the termination of the trace stroke (i.e. at the fiducial at which the trace stroke terminates), in each case as represented in the captured trace pattern data.

Sub step 102d represents determining whether width/radius is within threshold. In a first aspect the a unique authentic radius verification value may be associated with the trace pattern verification data of each user record. The authentic radius verification may be derived from a group of verification radius values, each verification radius value being associated with a coordinate value of the trace pattern verification data 52 of the authentic user record.

More specifically for at least one trace stroke, the authentic radius verification value may be the average radius value of a group of coordinates at, or within a predetermined offset from, either the fiducial at which the trace stroke commences or the fiducial at which the trace stroke terminates in the trace pattern verification data.

The authentication server 22 determines a verification radius value from the measured radius values associated with coordinate values of the captured trace pattern data is within a predetermined threshold of the authentic radius verification from the group of sequential coordinate values of the captured trace pattern data of the authentication package received from the authenticating computing device.

More specifically, for at least one trace stroke, the verification radius value may be the average radius value of a group of sequential coordinates at, or within a predetermined offset from, either the fiducial at which the trace stroke commences or the fiducial at which the trace stroke terminates, in the captured trace pattern data.

Sub step 102e represents determining whether the measured geolocation value is within a threshold. In a first aspect, an authentic geolocation verification value may be associated with the trace pattern verification data of each user record. The authentic geolocation verification value may be derived from a group of verified location values, each verified location value representing a known location frequented by the user. For example, a user may have two verified authentic locations: a home location and a work location.

The authentication server 22 determines whether the measured geolocation value is within a threshold distance of the authentic geolocation verification value. That is, the authentication server 22 determines whether the measured geolocation value is within a threshold of any of the verified location values for the user.

The threshold may be based on the precision of the measured geolocation value. For example, if the measured geolocation value is within a building with poor GPS reception, the threshold may be expanded to include a larger distance. The threshold may also be decreased for urban areas as compared to suburban or rural locations.

Sub step 102f represents determining whether the measured angle value is within a threshold of an authentic angle verification value. As described previously, the measured angle value may represent the orientation of the computing device when the captured trace pattern data was captured. Sub step 102f allows the angle that a user holds the computing device at when drawing a trace stroke to be used in authenticating a user.

In one example, the measured angle value may identify the computing device as in landscape mode or portrait mode when the captured trace pattern data was captured. In this example, the measured angle value and the authentic angle verification value may be limited to a value identifying either portrait mode or landscape mode. The user may only be authenticated if the authentic angle verification value (i.e., portrait or landscape) associated with the trace pattern verification data matches the measured angle value.

In another example, the authentic angle verification value may include a group of verification angle values, where each verification angle value is associated with a coordinate value of the trace pattern verification data 52 of the authentic user record. In this example, the authentic angle verification value may be equal to the average of the group of verification angle values. As will be understood by one of ordinary skill in the art, the authentic angle verification value is not limited to being equal to the average of the group of verification angle values, but may be determined from the group of verification angle values using any suitable method. For example, the authentic angle verification value may be determined to be the average of the group of verification angle values at, or within a predetermined offset from, either the fiducial at which the trace stroke commences or the fiducial at which the trace stroke terminates in the trace pattern verification data.

In a further example, the authentication server 22 may determine whether the measured angle value associated with each coordinate value of the captured trace pattern data is within a predetermined threshold of the authentic angle verification value associated with each coordinate value of the trace pattern verification data of the authentication package received from the authenticating computing device. For example, if a threshold percentage of the measured angle values associated with the captured trace pattern data are not within the predetermined threshold of the authentic radius verification values associated with the trace pattern verification data, then authentication of the user may fail.

Alternatively, the authentication server 22 may determine whether the average of the measured angle value associated with the captured trace pattern data is within a predetermined threshold of the average of the authentic radius verification value associated with each coordinate value of the trace pattern verification data of the authentication package received from the authenticating computing device.

The threshold used to authenticate the user based on the difference between the measured angle value and the authentic angle verification value may be a fixed value (e.g., +/−10°, 20°, 30°, 40°, etc.), a percentage value (e.g., a difference less than 10%, 20%, 30%, 40%, etc.). As will be understood by one of ordinary skill in the art, the threshold may be selected to be any suitable measure of the similarity between the measured angle value and the authentic angle verification value.

Step 106 represents determining whether the captured static coordinate 128 in the confirmation authentication package 122 is within a threshold of the authentic static coordinate 50 of the authentic record.

If the credentials are valid, which may mean if each of the identification of the selected depiction, the trace pattern, speed, and radius, and the static coordinates are all within the applicable threshold, the protected function is authorized by the authentication application 22 as depicted by step 110. More specifically, using the example where the application is a banking application, the authentication application 22 may generate a message to a banking server and banking application useful for the application and the banking server to establish a secure network connection for the exchange of account information.

In the event the credentials are determined not to be valid at step 100, authentication is denied as represented by step 108.

In summary, the present invention provides a system for authorizing the user of a application using a tri-part security mechanism which includes: i) the user possessing a specific computing device ii) the user having knowledge of a specific depiction, specific fiducials within the depiction, and a specific sequence of trace strokes between pairs of fiducials within the depiction; and iii) the user being physically capable for inputting the specific sequence of trace strokes with speed and touch radius matching speed and touch radius which may be unique to the authorized user.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:
1. A computing device, comprising:
a processor;
a computer readable memory;
a display screen;
a touch sensitive panel overlying the display screen;
an angle sensor; and
computing device application instructions coded in the computer readable memory and executed by the processor to:
  display a user-selectable photograph on the display screen, the user-selectable photograph including a group of fiducials,
  generate captured trace stroke pattern data, wherein:
    the captured trace stroke pattern data comprises multiple coordinate values along one or more trace strokes between a pair of fiducials from the group of fiducials on the touch sensitive panel where touched by a user,
    a measured angle value measured by the angle sensor and representing the angle of the touch sensitive panel when the captured trace pattern data was captured,
  initiate comparison of the captured trace stroke pattern data and associated measured angle value with trace pattern verification data and associated angle value, wherein:
    the trace pattern verification data comprises coordinate data values representing coordinate values along one or more trace strokes on the touch sensitive panel and the associated angle value, and
  provide for authentication of the user based on the comparison of the captured trace stroke pattern data and the trace pattern verification data, wherein the user is only authenticated if the measured angle value associated with the captured trace stroke pat- tern data matches, within a threshold, the angle value associated with the trace pattern verification data.

2. The computing device according to claim 1, wherein the measured angle value associated with the captured trace stroke pattern data and the angle value associated with the trace pattern data identify the touch sensitive panel as being in portrait mode or landscape mode and the user is authenticated only if the measured angle value and the angle value match.

3. The computing device according to claim 1, wherein:
the measured angle value comprises a measured angle associated with each coordinate value of the captured trace pattern data;
the angle value associated with the trace pattern verification data includes an angle associated with each coordinate data value of the trace pattern verification data.

4. The computing device according to claim 1, wherein the coordinate data values represent coordinate values along a plurality of trace strokes on the touch sensitive panel.

5. The computing device according to claim 4, wherein the plurality of trace strokes have a particular order as part of the comparison.

6. The computing device according to claim 1, wherein the computing device application instructions are executed by the processor to initiate comparison of the captured trace stroke pattern data with static coordinate data representing a specific location on the touch sensitive panel.

7. The computing device according to claim 1, wherein the measured angle value represents the angle of the touch sensitive panel along three orthogonal axes when the captured trace pattern data was captured.

8. The computing device according to claim 1, wherein the angle sensor includes at least one of a gyroscope and an accelerometer.

9. The computing device according to claim 1, further comprising a location sensor, wherein:
a measured geolocation value received from the location sensor is associated with the captured trace pattern data,
the measured geolocation value represents the location of the touch sensitive panel when the captured trace pattern data was captured,
the trace pattern verification data includes an associated geolocation value, and
the user is only authenticated if the measured geolocation value of the captured trace stroke pattern data matches, within a threshold, the geolocation value of the trace pattern verification data.

10. A computing device, comprising:
a processor;
a computer readable memory;
a display screen;
a touch sensitive panel overlying the display screen;
an angle sensor;
a location sensor; and
computing device application instructions coded in the computer readable memory and executed by the processor to:
display a user-selectable photograph on the display screen, the user-selectable photograph including a group of fiducials,
generate captured trace stroke pattern data, wherein:
the captured trace stroke pattern data comprises multiple coordinate values along one or more trace strokes between a pair of fiducials from the group of fiducials on the touch sensitive panel where touched by a user,
a measured geolocation value received from the location sensor is associated with the captured trace pattern data, and
the measured geolocation value represents the location of the touch sensitive panel when the captured trace pattern data was captured,
initiate comparison of the captured trace stroke pattern data and associated geolocation value with trace pattern verification data and associated geolocation value, wherein:
the trace pattern verification data comprises coordinate data values representing coordinate values along one or more trace strokes on the touch sensitive panel and the trace pattern verification data is associated with a geolocation value, and
a measured angle value measured by the angle sensor and representing the angle of the touch sensitive panel when the captured trace pattern data was captured is associated with the captured trace stroke pattern data,
the trace pattern verification data is associated with an angle value, and
provide for authentication of the user based on the comparison of the captured trace stroke pattern data and the trace pattern verification data, wherein the user is only authenticated:
if the measured geolocation value of the captured trace stroke pattern data matches, within a threshold, the geolocation value of the trace pattern verification data, and
if the measured angle value associated with the captured trace stroke pattern data matches, within a threshold, the angle value associated with the trace pattern verification data.

11. The computing device according to claim 10, wherein the location sensor determines the measured geolocation value using at least one of a global positioning system (GPS) receiver, an IP address of the computing device, cellular triangulation, or WIFI triangulation.

12. The computing device according to claim 10, wherein:
the geolocation value associated with the trace pattern verification data includes multiple locations, and
the user is only authenticated if the measured geolocation value of the captured trace stroke pattern data matches, within the threshold, at least one of the multiple locations of the geolocation value of the trace pattern verification data.

13. A method for authenticating a user of a computing device, the computing device including a processor; a computer readable memory; a display screen; a touch sensitive panel overlying the display screen; an angle sensor; and computing device application instructions coded in the computer readable memory and executed by the processor, the method comprising:
displaying a user-selectable photograph on the display screen, the user-selectable photograph including a group of fiducials,
generating captured pattern data, wherein:
the captured trace stroke pattern data comprises multiple coordinate values along one or more trace strokes between a pair of fiducials from the group of fiducials on the touch sensitive panel where touched by the user, and
a measured angle value measured by the angle sensor and representing the angle of the touch sensitive panel when the captured trace pattern data was captured, initiate comparison of the captured trace stroke pattern data and associated measured angle value with trace pattern verification data and associated angle value, wherein:
the trace pattern verification data comprises coordinate data values representing coordinate values along one or more trace strokes on the touch sensitive panel and the associated angle value, and
authenticating the user based on the comparison of the captured trace stroke pattern data and the trace pattern verification data, wherein the user is only authenticated if the measured angle value associated with the captured trace stroke pattern data matches, within a threshold, the angle value associated with the trace pattern verification data.

14. The method according to claim 13, wherein the measured angle value associated with the captured trace stroke pattern data and the angle value associated with the trace pattern data identify the touch sensitive panel as being in portrait mode or landscape mode and the user is authenticated only if the measured angle value and the angle value match.

15. The method according to claim 13, wherein:
the measured angle value comprises a measured angle associated with each coordinate value of the captured trace pattern data;
the angle value associated with the trace pattern verification data includes an angle associated with each coordinate data value of the trace pattern verification data.

16. The method according to claim 13, wherein the coordinate data values represent coordinate values along a plurality of trace strokes on the touch sensitive panel.

17. The method according to claim 16, wherein the plurality of trace strokes have a particular order as part of the comparison.

18. The method according to claim 13, wherein the measured angle value represents the angle of the touch sensitive panel along three orthogonal axes when the captured trace pattern data was captured.

19. The method according to claim 13, wherein:
the computing device additionally includes a location sensor,
a measured geolocation value received from the location sensor is associated with the captured trace pattern data,
the measured geolocation value represents the location of the touch sensitive panel when the captured trace pattern data was captured,
the trace pattern verification data includes an associated geolocation value, and
the user is only authenticated if the measured geolocation value of the captured trace stroke pattern data matches, within a threshold, the geolocation value of the trace pattern verification data.

20. A method for authenticating a user of a computing device, the computing device including an angle sensor, a processor; a computer readable memory; a display screen; a touch sensitive panel overlying the display screen; a location sensor; and computing device application instructions coded in the computer readable memory and executed by the processor, the method comprising:
displaying a user-selectable photograph on the display screen, the user-selectable photograph including a group of fiducials,
generating captured pattern data, wherein:
the captured trace stroke pattern data comprises multiple coordinate values along one or more trace strokes between a pair of fiducials from the group of fiducials on the touch sensitive panel where touched by the user, and
a measured geolocation value received from the location sensor is associated with the captured trace pattern data and the measured geolocation value represents the location of the touch sensitive panel when the captured trace pattern data was captured,
a measured angle value measured by the angle sensor and representing the angle of the touch sensitive panel when the captured trace pattern data was captured is associated with the captured trace stroke pattern data,
initiate comparison of the captured trace stroke pattern data and associated measured geolocation value with trace pattern verification data and associated geolocation value, wherein:
the trace pattern verification data comprises coordinate data values representing coordinate values along one or more trace strokes on the touch sensitive panel and the trace pattern verification data is associated with a geolocation value and an angle value, and
authenticating the user based on the comparison of the captured trace stroke pattern data and the trace pattern verification data, wherein the user is only authenticated:
if the measured geolocation value of the captured trace stroke pattern data matches, within a threshold, the geolocation value of the trace pattern verification data, and
if the measured angle value associated with the captured trace stroke pattern data matches, within a threshold, the angle value associated with the trace pattern verification data.

21. The method according to claim 20, wherein:
the geolocation value associated with the trace pattern verification data includes multiple locations, and
the user is only authenticated if the measured geolocation value of the captured trace stroke pattern data matches, within the threshold, at least one of the multiple locations of the geolocation value of the trace pattern verification data.

* * * * *